United States Patent Office 3,350,589
Patented Oct. 31, 1967

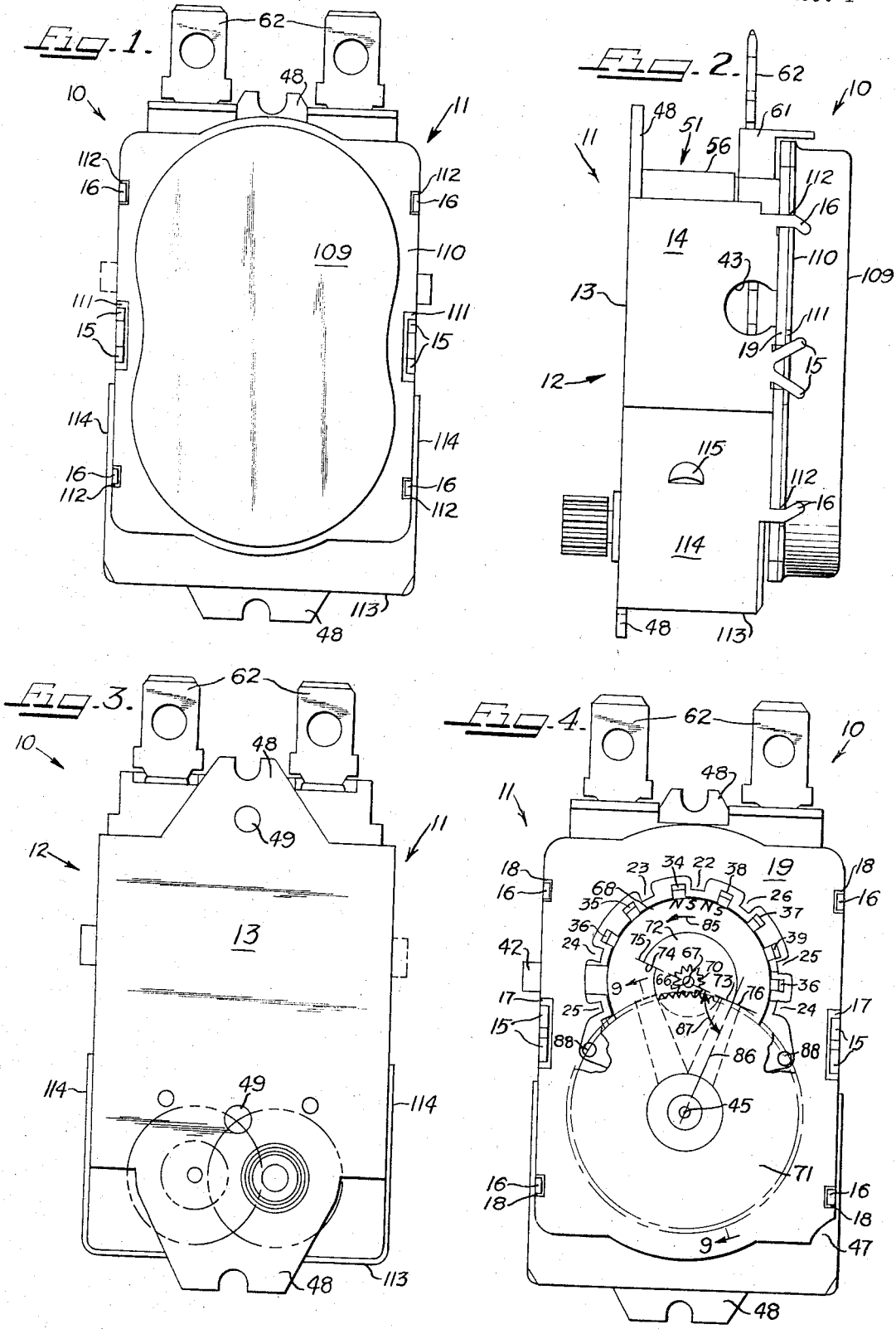

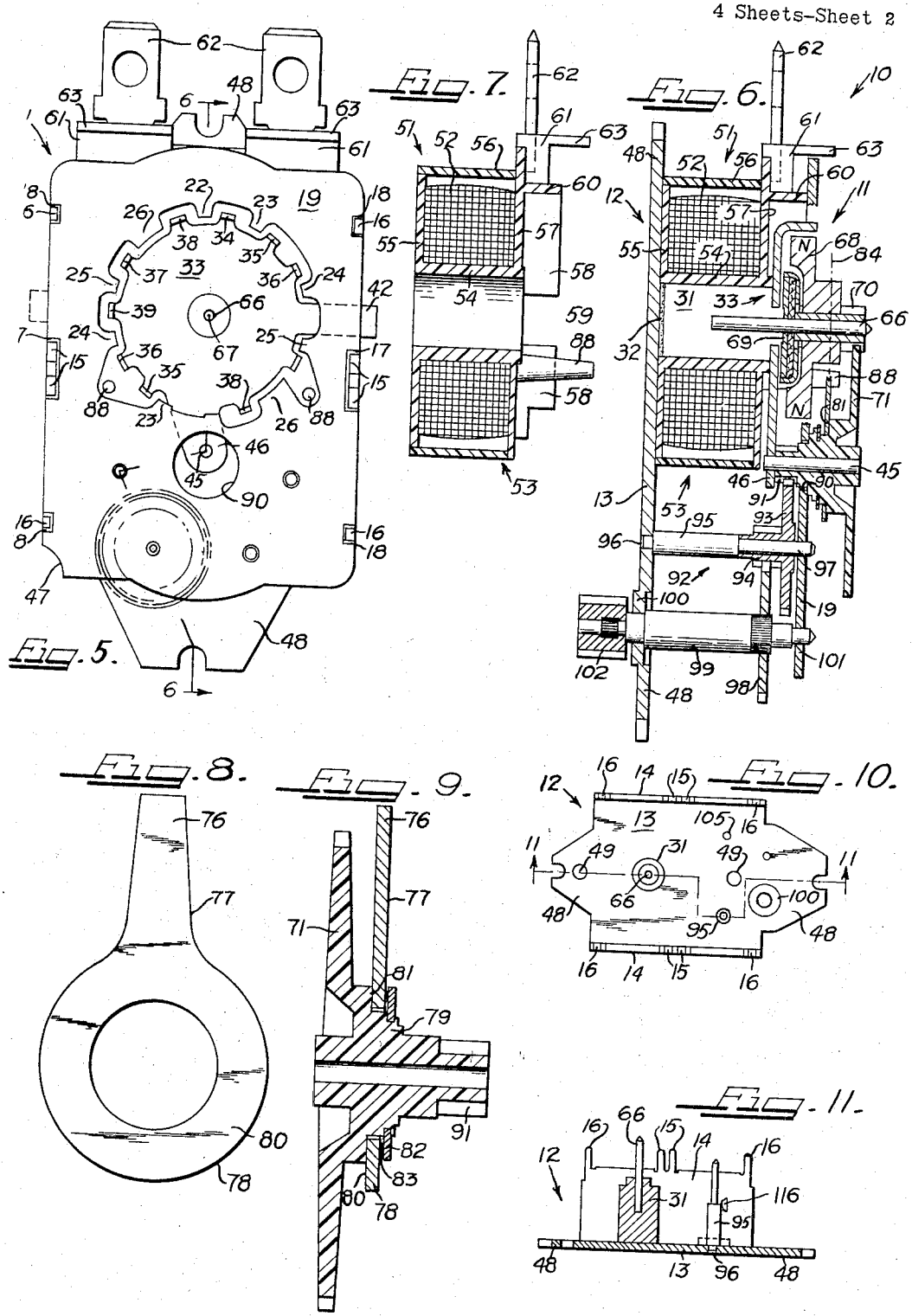

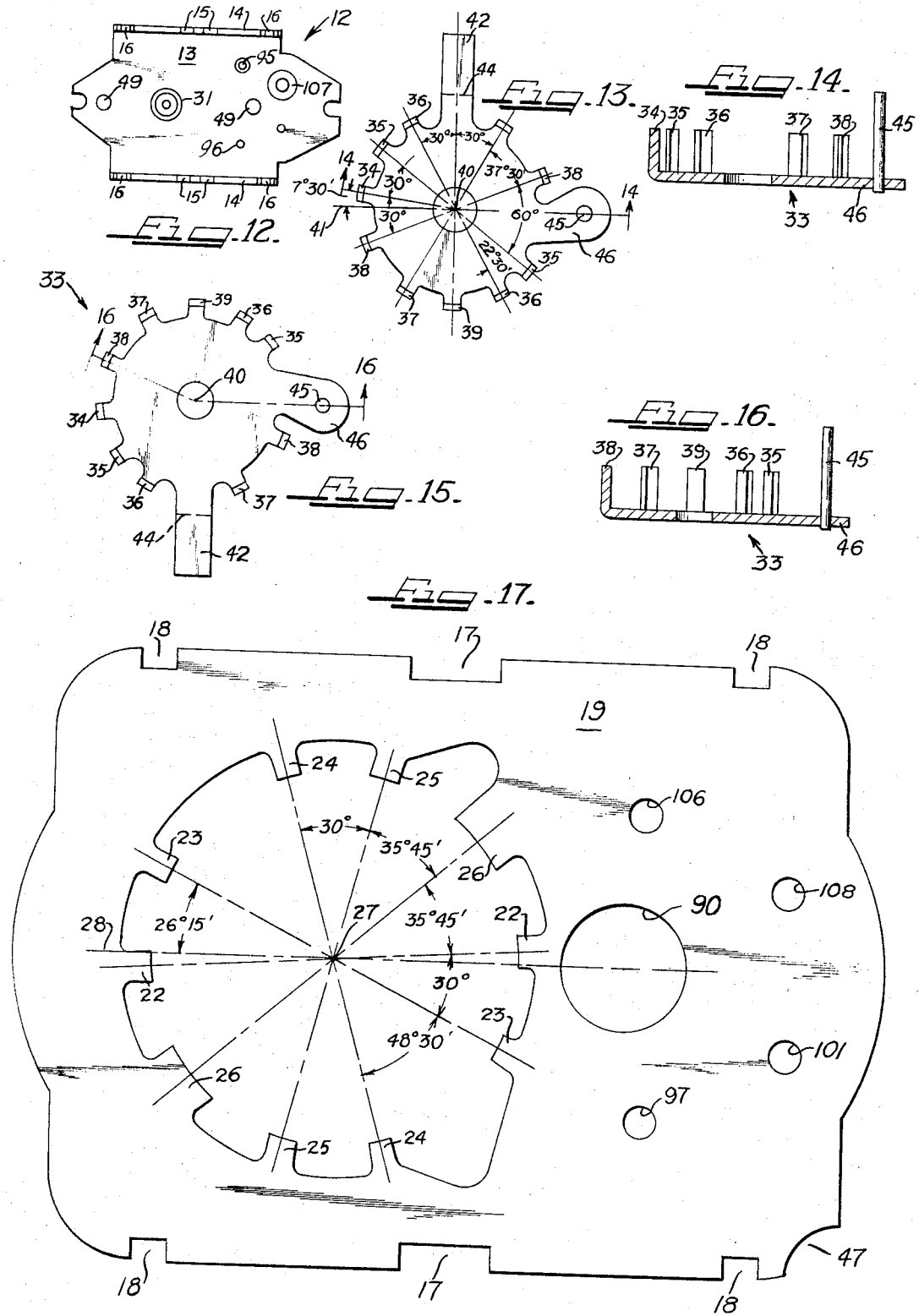

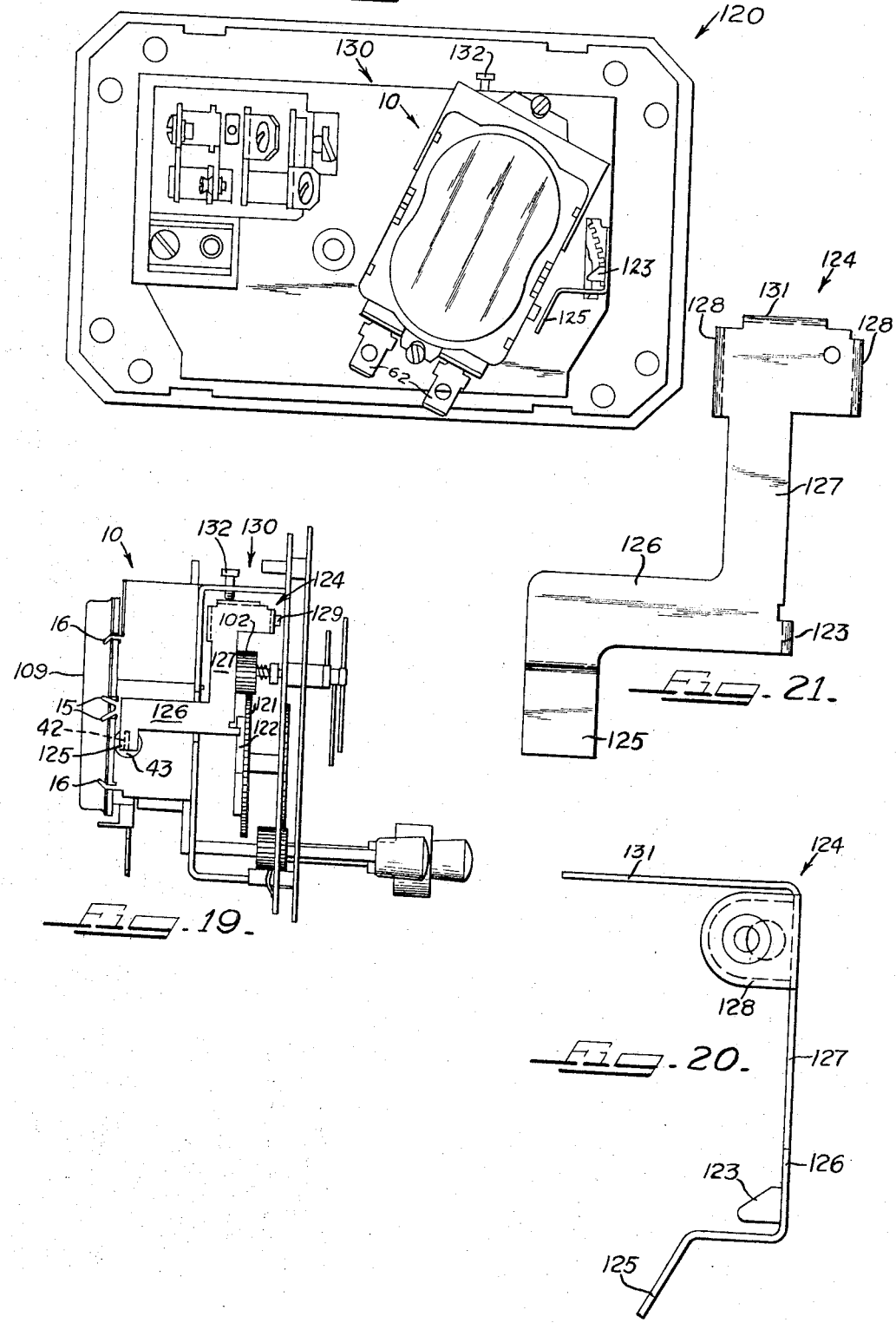

3,350,589
ELECTRIC MOTOR CONSTRUCTION
Ted N. Svarnias, Elmwood Park, Ill., assignor to International Register Company, Chicago, Ill., a corporation of Illinois
Filed Aug. 20, 1965, Ser. No. 481,315
17 Claims. (Cl. 310—164)

This invention relates, generally, to the construction of alternating current motors and it has particular relation to the construction of small synchronous motors employed for driving clocks, time switches and the like. It constitutes an improvement over the constructions disclosed in copending applications Ser. Nos. 315,321, filed Oct. 10, 1963, now abandoned; 369,412, filed May 22, 1964, now Patent No. 3,261,999, issued July 19, 1966, and 388,054, filed Aug. 7, 1964, now abandoned.

Among the objects of this invention are: To provide an improved, compact, efficient and powerful synchronous motor of relatively small size; to correlate the spacing between stator pole tips and the uniformly spaced poles around a permanent magnet rotor and the moment of inertia of the rotor such that the rotor will tend to rotate in one direction or the other on energization of the stator with alternating magnetic flux generated by a winding energized from an alternating current source, such as a 50- or 60-cycle-per-second source; to provide for stopping rotation of the rotor in one direction or the other and allowing it to rotate in the opposite direction under conditions where the rotor is positively vibrated for either starting position; to provide the rotor with a cam having shoulders circumferentially facing each other along a diameter for endwise engagement with an arm at right angles to the diameter to prevent rotation of the rotor in one direction or the other, depending upon which side of its axis of rotation the arm is located; to limit rotation of the arm out of the path of either of the shoulders by stop pins formed integrally with a bobbin carrying the energizing winding and located on opposite sides of the arm; to arrange for a pinion on the rotor to drive a gear which is symmetrically located with respect to a rectangular stator to facilitate various combinations of gear trains therewith driven by a pinion rotatable with the gear; to form one of the stator field plates with a pole piece extending through a side of the stator frame for cooperation with a movably mounted buzzer arm when the buzzer arm is released for movement in order to produce a signal; and to arrange for mounting the buzzer arm on one side or the other of the stator.

In the drawings:

FIG. 1 is a top plan view showing an electric motor embodying the present invention, the illustration there being double full size.

FIG. 2 is a view, in side elevation, looking from left to right of FIG. 1.

FIG. 3 is a bottom plan view of the motor construction shown in FIG. 1.

FIG. 4 is a top plan view of the motor construction shown in the preceding figures, the cover having been removed and the pole piece for operating the buzzer being shown as extending from the opposite side.

FIG. 5 is a top plan view of the motor construction shown in FIG. 1, the cover, rotor and gear driven thereby having been removed in order to show the details of construction.

FIG. 6 is a vertical sectional view taken generally along the line 6—6 of FIG. 5.

FIG. 7 is a vertical sectional view showing the energized winding in detached relation to the motor construction.

FIG. 8 is a top plan view at a greatly enlarged scale of the arm or lever that is employed to control the direction in which the rotor rotates.

FIG. 9 is a vertical sectional view at an enlarged scale taken generally along the line 9—9 of FIG. 4.

FIG. 10 is a top plan view at full scale of the rectangular mounting plate which forms a part of the stator.

FIG. 11 is a vertical sectional view taken generally along the line 11—11 of FIG. 10.

FIG. 12 is a view, similar to FIG. 10, but showing an alternate arrangement for the mounting of the gear train.

FIG. 13 is a top plan view of the inner field plate showing the pole tip for the buzzer extending from one side.

FIG. 14 is a vertical sectional view taken generally along the line 14—14 of FIG. 13, both figures being shown at double full scale.

FIG. 15 is a top plan view of the inner field plate with the pole tip for operating the buzzer extending from the opposite side, the showing corresponding to that shown in FIG. 13.

FIG. 16 is a vertical sectional view taken generally along the line 16—16 of FIG. 15.

FIG. 17 is a top plan view at a greatly enlarged scale, of the outer field plate, the showing being that which is employed in conjunction with the inner field plate as shown in FIG. 13 to provide the arrangement shown in FIG. 5 in the final assembly.

FIG. 18 is a view, in rear elevation, of a timer that is arranged to be operated by the motor of the present invention and illustrating how it can be employed for operating the buzzer member to give a signal at a predetermined time, the showing being at full scale.

FIG. 19 is a view, in end elevation, of the timer and motor assembly shown in FIG. 18.

FIG. 20 is a view, in side elevation, of the buzzer member shown in FIGS. 18 and 19, the showing being at double full scale.

FIG. 21 is a view, in side elevation, of the buzzer member shown in FIG. 20.

In FIGS. 1–6 of the drawings the reference character 10 designates, generally, a synchronous electric motor embodying the present invention and arranged to drive various timing devices such as clock mechanisms, time switches and the like. The motor 10 includes a stator 11 of magnetic material which has a generally rectangular cross section in order to provide a gear train housing which facilitates the use of a large number of gear trains without requiring any modification of the motor construction.

The stator of magnetic material 11 includes a rectangular mounting plate 12 that is shown more clearly in FIGS. 10, 11 and 12. The mounting plate 12 has a flat bottom 13 and upstanding parallel sides 14, thereby providing a generally U-shape. Pairs of ears 15 extend upwardly intermediate the top edges of the sides 14 and ears 16 extend upwardly similarly from near the ends of the sides 14 for extending through intermediate notches 17 and end notches 18 along the sides of an outer field plate 19, FIG. 17, and comprising another portion of the stator 11. In the assembly of the stator 11 the outer field plate 19 is applied to the upper edges of the parallel sides 14 with the ears 15 and 16 projecting through the respective notches 17 and 18. Not only does the outer field plate 19, when applied to the rectangular mounting plate 12 complete the magnetic circuit between the sides 14, but also the extension thereof together with the extension of the flat bottom 13 and the coextensive sides 14 provide a rectangular housing for the gear trains. The pairs of ears 15 are crimped outwardly, as indicated in FIG. 2, to hold the outer field plate 19 securely in position.

The outer field plate 19 is provided with relatively narrow diametrically opposite pairs of pole tips 22, 23, 24 and 25 which project radially inwardly and also a pair of relatively wide diametrically opposite pole tips 26. The pole tips 22–26 are located along a circle the center of which is indicated at 27 through which center line 28 extends. The angular relationships between the various pole tips are important in order to insure that the rotor, to be described, will vibrate strongly in the initial position when the motor is connected for energization to a suitable current source. The pole tip 23 is located with its center at an angle of 26° 15 minutes away from the center line 28. The pairs of adjacent poles 22 and 23 and 24 and 25 are spaced 30° apart. Pole tips 25 and 26 are spaced apart 35° 45 minutes as are pole tips 26 and 22. Pole tips 23 and 24 are spaced 48° 30 minutes apart. These angular spacings together with certain other relationships to be described insure that the rotor will vibrate strongly for starting purposes.

Referring to FIG. 6, a cylindrical magnetic core 31 is shown as comprising another part of the stator 11. The core 31 is welded as indicated at 32 to the flat bottom 13 of the rectangular mounting plate 12 and in a position midway between the upstanding parallel sides 14. At its distal end the cylindrical core 31 has an inner field plate 33 staked thereto. FIGS. 13 and 14 show the construction of the inner field plate 33. It includes a relatively narrow pole tip 34 and relatively narrow pairs of pole tips 35, 36, 37 and 38 and a pole tip 39. The pole tips 34–39 extend at right angles away from the cylindrical core 31 and also along a circle the center of which is indicated at 40, this center coinciding with the center 27 for the pole tips on the outer field plate 19. The center line for the inner field plate 33 is indicated at 41 and it coincides with the center line 28 for the outer field plate 19, both center lines being located in the same plane with the center line for the inner field plate 33 being located slightly below the center line for the outer field plate 19. Between the pole tips 36 and 37 to one side of the inner field plate 33 there is provided a relatively wide pole piece 42. It extends radially from the central portion of the inner field plate 33 and is arranged, as shown in FIG. 2, to extend through an opening 43 in one of the parallel sides 14. A buzzer arm is arranged adjacent the distal end of the pole piece 42 and, when released, it is arranged to vibrate with respect thereto under the influence of the alternating magnetic field in the stator 11 to provide a signal. Where the buzzer function is not desired, the wide pole piece 42 can be cut off as indicated at 44. The central portion of the inner field plate 33 has a lateral extension 46 between pole pieces 35 and 38 in which a shaft 45 is mounted for a purpose to be described.

The angular spacing of the pole tips 34–39 with respect to each other and with respect to the pole tips 22–26 of the outer field plate 19 is of importance. The relationships shown in FIG. 13 have been found to provide highly satisfactory results. The pole piece 34 is spaced from the center line 41 through an angle of 7° 30 minutes. The pole pieces 34 and 35 are spaced apart 30°. The angular spacing between pole tip 35 and the wide pole piece 43 is 30°, this being the same angular spacing that is employed between the pole tips 36 and 39. The same spacing of 30° is provided between the pole piece 42 and the pole piece 37 and this same spacing is employed between the pole tips 39 and 37. The angular spacing between pole tips 37 and 38 is 37° 30 minutes. The angular spacing between the pole tips 38 and 35 is 60° and the angular spacing between the pole tips 35 and 36 is 22° 30 minutes. As shown in FIG. 5 the pole tips on the inner field plate 33 are interspersed among the pole tips on the outer field plate 19 with the angular relationships being as outlined.

When it is desired to have the relatively wide pole piece 42 extend through the other of the parallel sides 14 for operation of a buzzer arm on this side, the arrangement shown in FIGS. 15 and 16 is employed, this being the same as that shown in FIGS. 13 and 14 with the exception that, instead of forming the pole tips 34–39 in the right angular relationship as shown for FIGS. 13 and 14, they are turned in the opposite direction to extend from the opposite face. However, the spacing between the pole tips is the same as outlined for the inner field plate 33 as shown in FIG. 13. The shaft 45 extends from the opposite side of the extension 46.

In order to accommodate the inner field plate 33 as shown in FIGS. 15 and 16, the outer field plate 19 is turned upside down from its position shown in FIGS. 5 and 17. In order to indicate the position of the outer field plate 19, it is provided with an identification notch 47 which is differently located in FIGS. 4 and 5, depending upon the configuration of the inner field plate 33 and whether the relatively wide pole piece 42 for the buzzer extends from the left side, as shown in FIG. 4, or the right side as shown in FIG. 5.

The flat bottom 13 is provided with slotted end sections 48 to facilitate mounting on a suitable support. Also pilot holes 49 are provided for manufacturing purposes.

The energizing winding is indicated, generally, at 51 in FIGS. 6 and 7. It includes a coil 52 of a large number of turns of small diameter wire which are wound on a bobbin, shown generally at 53, that is formed of suitable plastic insulating material such as nylon. The bobbin 53 has a cylindrical central portion 54 which fits closely around the cylindrical core 31. It has an annular bottom flange 55 and a cylindrical cover 56 surrounds the coil 52 and can be slid over the periphery of the bottom flange 55. At its upper end the bobbin 53 has a rectangular top flange 57 which is positioned below the inner field plate 33 and between the upstanding parallel sides 14. The rectangular top flange 57 has upstanding side walls 58 which are spaced close to the inner sides of the sides 14 and are provided with notches 59, one on each side, to receive the pole piece 42 for the buzzer at one or the other sides as the case may be. The side walls 58 are interconnected by a transverse end flange 60 and socket portion 61 extend therefrom, FIG. 5, for receiving terminals 62 which are connected to the ends of the coil 52 and are arranged to be connected to a source of alternating current. Upstanding flanges 63 from the socket portions 61 provide the required creepage distance between the energized terminals 62 and the stator 11.

A stationary pin or shaft 66 extends upwardly and centrally from the cyindrical core 31. Its vertical axis is indicated at 67 and this axis coincides with the axes 27 and 40 for the circles along which the pole tips on the outer field plate 19 and inner field plate 33 are located.

Mounted for rotation on the upper end of the stationary pin or shaft 66 is a rotor 68 that is formed of ceramic or plastic bound ferrite material which can be permanently magnetized. As shown in FIG. 4 the ceramic rotor 68 is provided with a plurality of permanent magnet north and south poles along its periphery. There may be 12 north and 12 south poles in alternating relationship. When the energizing winding 51 is connected to a 60-cycle per second source of alternating current, the rotor 68 operates at a speed of 300 r.p.m. When the source is a 50-cycle per second source, the rotor 68 operates at a speed of 250 r.p.m. A lubricating device 69 is provided between the upper end of the cyindrical core 31 and the adjacent side of the rotor 68.

A pinion 70 is mounted on the rotor 68 to rotate conjointly therewith. The pinion 70, as shown in FIG. 6, has driving engagement with a gear 71 which is rotatably mounted on the shaft 45 which extends from the inner field plate 33 to the outer field plate 19.

Formed integrally with the rotor 68 is a cam 72, FIG. 4, which is provided with shoulders 73 and 74 that face circumferentially in opposite directions and are located along a diameter 75 of the rotor 68. The shoulders 73 and 74 form a part of a mechanism for insuring that the rotor 68 will rotate only in one direction. One or the other of the shoulders 73 or 74 is arranged to be engaged by a distal end or detent 76 of a plate like arm or lever 77 which is shown more clearly in FIGS. 8 and 9. The arm or lever 77 has a flat hub portion 78 that is rotatably mounted on a hub 79 of the gear 71. The flat hub portion 78 of the arm or lever 77 has a flat surface 80 that is arranged to engage frictionally a flat end surface 81 on the hub 79 to the end that the arm or lever 77 tends to rotate conjointly with the gear 71 by this frictional engagement which is relatively slight. A retaining washer 82, secured to the hub 79, serves to hold the arm or lever 77 in its proper position against axial movement. A lubricant, indicated at 83, is applied to the flat hub portion 78 and to the adjacent surfaces of the gear 71 and the retaining washer 82 in order to maintain proper operating conditions with sufficient friction to cause the arm or lever 77 to rotate conjointly with the gear 71 to a limited extent but, when further movement is arrested, to provide a neglible amount of friction against further rotation of the gear 71. In FIG. 6 it will be observed that the flat end surface 81 on the gear 71 is located in a plane, indicated by broken line 84, which extends through the cam 72.

FIG. 4 illustrates the operation of the arm or lever 77 in conjunction with the shoulder 73 to prevent rotation of the rotor 68 in a clockwise direction and permit its rotation in a counterclockwise direction indicated by arrow 85. The longitudinal axis of the arm or lever 77 is indicated by broken line 86. Assuming that the rotor 68 has stopped in a position other than as shown in FIG. 4, if, on energization of the winding 51, the rotor 68 tends to rotate in a clockwise direction, the pinion 70 drives the gear 71 and the arm or lever 77 rotates therewith to position the distal end or detent 76 as located by full lines in the path of the shoulder 73. In this position the longitudinal axis 86 of the arm or lever 77 is at an angle 87, preferably of 90°, to the diameter 75. Then a force is applied through the shoulder 73 along the longitudinal axis 86 of the arm or lever 77 with the result that only a compressive force is applied thereto. There is no resilient action provided by the arm or lever 77 and the endwise compressive force applied thereto is resisted by the hub 79 and in turn by the shaft 45 on which it is rotatably mounted. In this position of the rotor 68 with the shoulder 73 in engagement with the distal end or detent 76, the rotor 68 vibrates strongly because of the particular spacing of the pole tips on the outer field plate 19 and the inner field plate 33. The action is such as to cause the rotor 68 to rebound sharply and rotate in the counter clockwise direction indicated by the arrow 85. This rotation is accompanied by rotation of the gear 71 in the opposite direction and shift the arm or lever 77 is rotated conjointly therewith to a position out of the path of the shoulder 73.

When the arm or lever 77 is positioned as shown by broken lines in FIG. 4 with the longitudinal axis 86 on the other side of the axis 67 of rotation of the rotor 68, the distal end or detent 76 cooperates with the shoulder 74 to prevent counter clockwise rotation of the rotor 68 and permit clockwise rotation thereof.

It is desirable that the rotation of the arm or lever 77 away from the path of the shoulder 73 or 74 be limited. For this purpose stop pins 88 are provided. Preferably, they are formed integrally with the rectangular top flange 57 of the plastic bobbin 53. They extend through suitable notches in the outer field plate 19 and into the path of the distal end or detent 76 where further rotation of the arm or lever 77 is prevented in one direction or the other.

The outer field plate 19 is provided with a relatively large diameter clearance opening 90 through which a pinion 91, rotatable with the gear 71, can be positioned for rotation on the shaft 45. Thus the pinion 91 is positioned below the outer field plate 19 where it can drive a gear train, indicated generally at 92, within the rectangular space provided between the rectangular mounting plate 12 and the outer field plate 19. Various combinations of gear trains having various gear ratios can be employed. For illustrative purposes a gear train 92 is shown as including a gear 93 and a pinion 94 both rotatably mounted on a pin 95 upstanding from the flat bottom 13. The lower end of the pin 95 extends into an opening 96 in the flat bottom 13. The upper end of the pin 95 which is reduced in diameter for rotatably mounting the gear 93 and pinion 94, extends through an opening 97 in the outer field plate 19, this opening, of course, registering with the opening 96 in the flat bottom 13. The gear train also can include a gear 98 driven by the pinion 94 and mounted on an output shaft 99 which, at its lower end, is journaled in an offset bearing portion 100 formed in the flat bottom 13. The other or upper end of the output shaft 99 is journaled in an opening 101 in the outer field plate 19, this opening registering with the opening through the offset bearing portion 100. An output pinion 102 is driven by the output shaft 99 and is arranged to be connected to various devices to be driven by the motor 10.

FIGS. 10 and 11 show one arrangement for the rectangular mounting plate 12 to accommodate the gear train 92 shown in FIG. 6. This represents only one of the many arrangements that can be made for using different gear trains to be driven by the pinion 70 that rotates with the rotor 68. It will be noted in FIG. 10 that the flat bottom 13 has an opening 105 which is employed, as shown in FIG. 12, for receiving the pin 95. Registering with the opening 105 is an opening 106 in the outer field plate 19. Likewise, as shown in FIG. 12, an offset bearing portion 107 is provided in the flat bottom 13 that corresponds to the offset bearing portion 100 shown in FIG. 10 for mounting the output shaft 99. Using the arrangement shown in FIG. 12, the output shaft 99 can be journaled in the offset bearing portion 107 with the other or upper end being journaled in an opening 108 in the outer field plate 19 registering therewith.

As pointed out the shaft 45 on which the gear 71 is mounted for rotation is located midway between the parallel sides 14 of the mounting plate 12. The shaft 45 also is located in the plane of the axis of rotation of the rotor 68 with the result that a symmetrical construction is provided for the location of the pinion 91 that rotates with the gear 71. The openings and offset bearing portions 96, 97, 100 and 101 are located to one side of the vertical plane extending midway between the sides 14 of the rectangular mounting plate 12. The openings and offset bearing portions 105, 106, 107 and 108 are located on the opposite side of this plane with both sets of openings and offset bearing portions being symmetrically disposed. This makes it possible to employ a wide variety of gear trains and gear ratios therefor between the pinion 91 and the output pinion 102.

As shown in FIGS. 1 and 2 a cover 109, preferably formed of aluminum, is employed to enclose the rotor 68 and gear 71. The cover 109 has a peripheral flange 110 which is provided with intermediate notches 111 through which crimped over pairs of ears 15 can project. The flange 110 has end notches 112 for receiving the ears 16 and, as shown in FIG. 2, they are crimped over not only to hold the cover 109 in position but also to hold additionally the outer field plate 19 securely in position along the edges of the sides 14.

A U-shaped end cover 113 closes off the end of the stator 11 where the gear train 92 is located. The cover 113 is provided with laterally extending sides 114 which overlie the parallel sides 14 of the rectangular mounting plate 12. Lugs 115 struck from the sides 114 are arranged to extend into openings 116, FIG. 11, in the sides 14 for holding the end cover 113 in position.

The manner in which the motor 10 can be employed for operating a buzzer is shown in FIGS. 18 and 19 in conjunction with a timer, indicated generally at 120, of the kind referred to in copending application Ser. No. 301,464 filed Aug. 12, 1963, now Patent No. 3,262,110, issued July 19, 1966, having provided therefor a buzzer member generally similar to that shown in this application here modified for use in conjunction with the pole piece 42. The motor 10 is mounted as shown here with the pole piece 42 extending to the right side. The pinion 102 of the motor 10 is arranged to drive a gear 121 which forms a part of the gear train of the timer 120. Rotatable with the gear 121 is a cam 122 that is arranged to hold a sensing finger 123, FIGS. 20 and 21, in such position that the buzzer member 124 on which it is mounted is held in a non-operated position. When a notch (not shown) in the cam 122 is engaged by the sensing finger 123, the buzzer member 124 no longer is held in the inoperative position. A spring urges a hammer 125 formed by an inclined section toward engagement with the pole piece 42 and causes it to vibrate as a result of the alternating magnetic flux generated by the energizing winding 51. The hammer 125 is carried by a leg 126 of the buzzer member 124 which is joined to a leg 127 that carries the sensing finger 123. The leg 127 has arms 128 extending therefrom for rotatable mounting on a support stud 129 which is carried by a frame 130 that forms a part of the timer 120. An adjusting tongue 131 extends from the leg 127 and an adjusting screw 132 cooperates therewith to control the operation of the buzzer member 124 after the sensing finger 123 is released from engagement with the cam 122.

In some instances it is desirable that the buzzer member 124 be mounted for operation from the opposite side of the motor 10 from that shown in FIG. 18. For such application the construction is used in which the pole piece 42 extends from the opposite side.

What is claimed as new is:

1. An electric motor construction comprising, a magnetic field structure including: a rectangular mounting plate having upstanding generally parallel sides along one pair of opposite edes and providing a flat bottom U-shape, a ore extending upwardly from and secured at its lower end to said flat bottom of said mounting plate midway said sides, an inner field plate secured to the upper end of said core having a plurality of pole tips extending at right angles away from said core in spaced relation along a circle whose diameter is less than the distance between said sides of said mounting plate, and an outer field plate interconnecting the distal edges of said sides of said mounting plate, forming therewith a housing having a rectangular cross section, and having radially inwardly extending pole tips interspersed among said pole tips on said inner field plate along said circle; an energizing winding on said core between said mounting plate and said inner field plate for connection to an alternating current source, a shaft extending axially of said core and of said circle along which said pole tips are located, a permanent magnet rotor on said shaft rotatable within said pole tips and having a plurality of poles along its periphery, a cam rotatable with said rotor having a pair of radially extending shoulders circumferentially facing in opposite directions, a pinion rotatable with said rotor, a gear driven by said pinion and rotatably mounted on said housing midway said sides, an arm rotatable about the axis of rotation of and frictionally engaging said gear, the distal end of said arm being engageable with one or the other of said shoulders depending upon the side of the axis of rotation of said cam on which said arm is positioned with said rotor located with respect to said pole tips such that it is positively vibrated by the alternating magnetic flux whereby said rotor starts to rotate in one direction or the other in a corresponding direction, and stop means limiting rotation of said arm in either direction when said distal end thereof is moved out of the path of the respective shoulder.

2. The invention, as set forth in claim 1, wherein the gear has a flat end surface in a plane transverse to the axis of rotation of the cam, the arm has a flat portion journaled for rotation on and flatwise frictionally engaging said flat end surface of said gear, and the flat portion of said arm extends to its distal end in the plane of the cam whereby on engagement with either shoulder only a compressive force is applied thereby to said arm and said distal end in either position engages the respective shoulder at right angles to the plane of the shoulders.

3. The invention, as set forth in claim 2, wherein a pinion is rotatable with the gear, and the arm is positioned between said pinion and said gear.

4. The invention, as set forth in claim 1, wherein the gear has a pinion rotatable therewith in the housing, and the mounting plate and the outer field plate have registering openings symmetrically located on opposite sides of a plane containing the axes of the rotor and gear for receiving the ends of gear carrying shafts whereby various combinations of gear trains driven by said pinion can be mounted thereon in the housing.

5. The invention, as set forth in claim 1, wherein at least one of the parallel sides of the mounting plate has an aperture through which a pole piece extends from the inner field for cooperation with a movably mounted buzzer arm to operate the same on release thereof.

6. The invention, as set forth in claim 1, wherein each of the parallel sides has an aperture through one or the other of which a pole piece extends from the inner field plate for cooperation with a buzzer arm to operate the same on release thereof, said buzzer arm being movably mounted adjacent said pole piece.

7. The invention, as set forth in claim 1, wherein ears extend upwardly from intermediate portions of the parallel sides and overlie the outer field plate and hold it in place, a cover overlies said outer field plate, and ears extend upwardly from end portions of said parallel sides and overlie said cover to hold it and said outer field plate in place.

8. The invention, as set forth in claim 1, wherein the energizing winding is mounted on a bobbin formed of insulating material, and the stop means comprises a pair of pins integral with said bobbin and extending upwardly past the inner field plate and through the outer field plate.

9. Means for permitting rotation of a permanent magnet rotor in one direction when the associated stator is energized by alternating current and preventing rotation of said rotor in the opposite direction comprising, a cam for rotation with said rotor having a radially extending shoulder, a drive pinion for rotation with said rotor, a gear driven by said pinion having a driven pinion rotatable therewith and an end surface therebetween in a plane transverse to the axis of rotation of said cam, and an arm having a flat portion journaled for rotation about the axis of rotation of said gear and flatwise frictionally engaging said end surface, the distal end of said arm being engageable with said shoulder on rotation of said rotor in said opposite direction to prevent continued rotation thereof in said opposite direction.

10. The invention, as set forth in claim 9, wherein the flat portion extends to the distal end of the arm in the plane of the cam whereby on engagement with the shoulder only a compressive force is applied thereby to said arm.

11. Means for permitting rotation of a permanent magnet rotor in one direction when the associated stator is energized by alternating current and preventing rotation of said rotor in the opposite direction comprising, a cam for rotation with said rotor having a pair of radially extending shoulders circumferentially facing in opposite directions, a pinion for rotation with said rotor, a gear driven by said pinion having a flat end surface in a plane transverse to the axis of rotation of said cam, and an arm having a flat portion journaled for rotation about the axis of rotation of said gear and flatwise frictionally engaging said end surface, the distal end of said arm being engageable with one or the other of said shoulders depending upon the side of the axis of rotation of said cam on which said arm is positioned on rotation of said rotor in a corresponding direction to prevent continued rotation thereof in said direction.

12. The invention, as set forth in claim 11, wherein the shoulders lie in a plane along a diameter of the rotor.

13. The invention, as set forth in claim 12, wherein the distal end of the arm in either position engages the respective shoulder at right angles to the plane of the shoulders.

14. A self starting synchronous motor comprising, a field structure including outer and inner field plates having pole tips unequally spaced along a circle, an energizing winding for said field structure for connection to a source of alternating current, a permanent magnet rotor having a plurality of equally spaced permanent poles of opposite polarities and rotatable by the alternating magnetic field from said pole tips, a cam rotatable with said rotor having a pair of radially extending shoulders circumferentially facing in opposite directions, a pinion rotatable with said rotor, a gear driven by said pinion, an arm rotatable about the axis of rotation of and frictionally engaging said gear, the distal end of said arm being engageable with one or the other of said shoulders depending upon the side of the axis of rotation of said cam on which said arm is positioned with said rotor located with respect to said pole tips such that said rotor is positively vibrated by the alternating magnetic flux whereby said rotor starts to rotate in a corresponding direction, and stop means limiting rotation of said arm in either direction when said distal end thereof is moved out of the path of the respective shoulder.

15. The invention, as set forth in claim 14, wherein the spacing between the pole tips of the inner and outer field plates is such that the reaction therebetween and the rotor poles on energization of the winding is the same whether said field plates are individually disposed right side up or upside down with the pole tips on said inner field plate in each case being interspersed with the pole tips of said outer field plate.

16. A self starting synchronous motor comprising
   a magnetic field structure including outer and inner field plates having interspersed pole tips along a circle,
   an energizing winding for said field structure for connection to a source of alternating current to energize said pole tips on the respective field plate with instantaneous opposite polarities, and
   a permanent magnet rotor having a plurality of equally spaced permanent magnet poles of alternating opposite polarities in and subject to the magnetic flux from said pole tips,
   at least one of the pole tips on one of said field plates having an arcuate length greater than the arcuate length of other pole tips on said one field plate to provide a magnetic asymmetry with respect to said permanent magnet poles on said rotor.

17. The motor as set forth in claim 16 wherein said one field plate is said outer field plate.

References Cited

UNITED STATES PATENTS 3,261,999  7/1966  Gallagher et al. _____ 310—164

MILTON O. HIRSHFIELD, *Primary Examiner.*

L. L. SMITH, *Assistant Examiner.*